Figure 1:
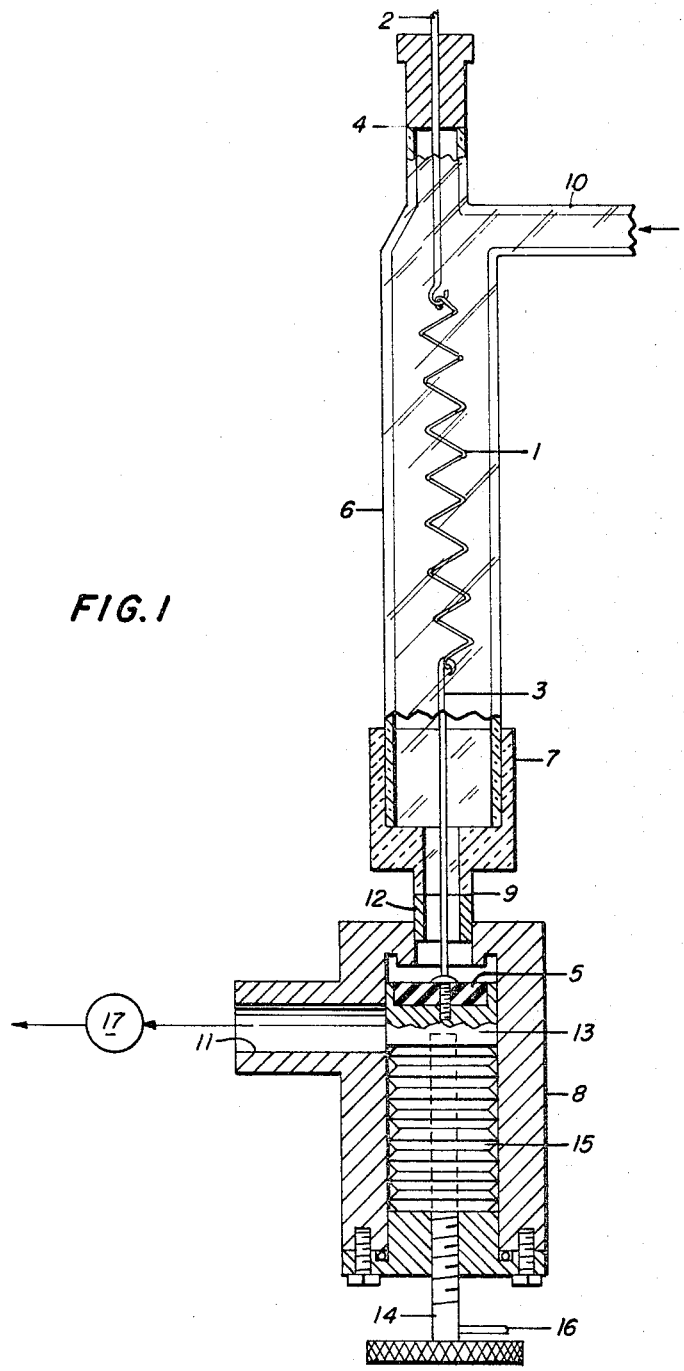

July 25, 1967

D. M. BAILEY ETAL 3,332,745

METHOD OF QUANTITATIVELY DETERMINING TRACE
IMPURITIES IN INERT GAS SYSTEMS

Filed Dec. 20, 1963

3 Sheets-Sheet 1

INVENTORS
WILLIAM T. ABEL
DESMOND M. BAILEY
PETER G. SALGADO

BY Ernest S. Cohen
William S. Brown

ATTORNEYS

United States Patent Office 3,332,745
Patented July 25, 1967

3,332,745
METHOD OF QUANTITATIVELY DETERMINING TRACE IMPURITIES IN INERT GAS SYSTEMS
Desmond M. Bailey, Memphis, Tenn., William T. Abel, Morgantown, W. Va., and Peter G. Salgado, Los Alamos, N. Mex., assignors to the United States of America as represented by the Secretary of the Interior
Filed Dec. 20, 1963, Ser. No. 332,312
14 Claims. (Cl. 23—232)

The invention herein described and claimed may be used by or for the Government of the United States of America for governmental purposes without the payment of royalties thereon or therefor.

This invention relates to the determination of amounts of impurities in an inert gas system.

Inert gases find a wide variety of applications in industry, many of which require that the gas be in a high state of purity. It is therefore important to be able to determine, conveniently and accurately, the amount of impurities in such gases.

One important use of inert gases is that cooling medium for nuclear reactors. In such a process, heat is transferred from the reactor by means of a cooling gas such as helium. At the high temperatures of operation even trace amounts of impurities in the coolant gas may react destructively with structural materials of the reactor and the process heat equivalent. Oxidizing gases such as $H_2O$, $O_2$ and $CO_2$ have been found to be particularly undesirable since they react rapidly with many hot structural materials. An accurate knowledge of the quantities of such undesirable impurities is therefore obviously desirable.

Other industrial or research operations in which a knowledge of the amount of impurities in gases is important are (1) testing of structural materials, (2) studying reactions under high purity conditions in an inert atmosphere, and (3) evaluations of gas purification systems.

A variety of means have previously been employed for determining impurities in small concentration, e.g., mass spectrographic and gas chromatographic methods. However, these methods are frequently too expensive and difficult to adapt to "on-the-scene" use.

It is therefore an object of the present invention to provide a simple and inexpensive method for determining amounts of impurities in an inert gas system.

A further object of the invention is to provide a method for determining the amount of oxidizing impurities in an inert gas system.

It has now been found that these objectives may be achieved by means of a method in which a hot filament is exposed to the inert gas whereby the impurities in the gas react with the filament, thereby affecting a change in weight of the filament. This change in weight when calibrated with gases containing known amounts of impurities, provides a measure of the amounts of impurities in the gas.

The method has been found to be of particular value in the case of oxidizing impurities such as $O_2$, $H_2O$ or $CO_2$. These impurities react with the hot filament to form oxides of the metal forming the filament that are volatile at the temperature of the filament. The loss in weight of the filament provides a measure of the amount of impurity as will be more fully described in the examples below.

The method may also be used to determine amounts of hydrocarbon impurities in an inert gas. The hydrocarbons react with the filament to form carbides which are not volatile; therefore, the measure of the amount of the hydrocarbon impurities is the increase in weight of the filament.

By operating at much lower filament temperatures, approximately 1200–1400° F., oxidizing impurities could be determined by weight-gain of the filament rather than weight-loss. At these temperatures such oxidizing gases as $O_2$ and $H_2O$ react to form tungsten oxides. Since the temperature is below their sublimation temperatures, these oxides remain on the filament surface as a coating. Under these conditions, a filament weight-gain would indicate the amount of oxidizing impurity by reference to a calibration curve similar to those for weight-loss of the filament.

Although tungsten has been found to be particularly effective in the invention, other metals such as molybdenum and tantalum, whose oxides sublime at temperatures lower than the melting temperature of the metal may be used.

The apparatus employed in the examples is illustrated in FIGURE 1. Tungsten filament 1 is supported by means of electrical lead wires 2 and 3 which are secured to the cap of metal-to-glass Kovar fitting 4 and movable valve seat gasket 5. The filament is enclosed 7/8″ I.D. Pyrex tube 6, the lower end of which is a male ground glass joint which fits into the female ground glass joint 7. Joint 7 is mounted in high vacuum bellows-sealed valve 8 by means of a glass-to-metal Kovar seal 9. The gas to be analyzed enters via connection 10 and is exhausted through outlet 11 and flow meter 17.

Kovar fittings 4 (made by Corning Glass Company) consists of a Pyrex glass tube sealed to a copper tube, the latter being at the upper end of the fitting. Electrical lead wire 2 is welded into a cap over the metal end of the tube.

Another Kovar fitting 9 joins ground glass joint 7 and copper tubing 12 which is welded into bellows-sealed valve 8.

The high vacuum bellows-sealed valve 8, comprising valve seat 13, valve stem 14, seat gasket 5, flexible copper seal 15 (soldered at both ends) and electrical lead wire 16, provides a gas-tight seal between the atmosphere side of the valve stem and the seat side of the valve stem by means of flexible seal 15 that moves in and out with the valve stem. It is a full-opening valve so that no restrictions are introduced by the valve.

The function of the valve is to provide an easy means for adjusting tension on the tungsten filament while the system is closed. Filament support rod 3 is attached to the valve seat; as the valve is opened the support rod moves down, thereby stretching the filament and establishing good electrical contact between filament and support rods.

While the above-described apparatus has proved quite satisfactory, the invention is not limited to this particular apparatus. Many other types of apparatus, designed to provide the necessary conact between filament and gas without exposure to atmospheric contamination, will be obvious to those skilled in the art. For example, a tubular filament may be employed in place of the wire filament of the above-described apparatus. In such a device, the gas is passed through the tubular filament and the reaction of the metal with impurities in the gas takes place within the filament.

The following examples will serve to more particularly describe the invention.

*Example 1*

This illustrates the effect of helium and helium containing oxidizing impurities on an incandescent tungsten filament.

The apparatus used was that shown in FIGURE 1 and described above. The filament was weighed, placed in the apparatus as shown in FIGURE 1 and a flow of helium or helium containing oxidizing gases was established. After a measured volume of gas (determined from flow rate and length of time of test) had passed through the apparatus, in contact with the electrically heated filament, the flow of gas was stopped, the filament was allowed to cool and was then removed and weighed. Results are shown in Table I and in the graphs of FIGURES 2 and 3.

TABLE I.—THE EFFECT OF HELIUM ON INCANDESCENT TUNGSTEN FILAMENT

| Atmosphere | Run No. | Flow rate (s.c.f.h.) | Length of run (min.) | Filament temperature (°F.) | Filament weight loss (gm.) |
|---|---|---|---|---|---|
| Cylinder helium, grade A, system thoroughly outgassed and helium stream purified by passing through liquid-air cooled trap and hot tantalum tower. | 1 | 0.9 | 15.0 | 2,700 | 0.00000 |
| | 2 | 0.9 | 15.0 | 2,700 | 0.00006 |
| | 3 | 0.9 | 15.0 | 2,700 | 0.00000 |
| | 4 | 0.9 | 15.0 | 2,700 | 0.00009 |
| | 5 | 0.9 | 15.0 | 2,700 | 0.00007 |

The data of this table show the effect of helium alone on the incandescent filament. By comparing filament weight loss with the calibration curves of FIGURE 2 it is apparent that much less than 10 p.p.m. oxidizing impurity was present in the helium.

Figure 2:
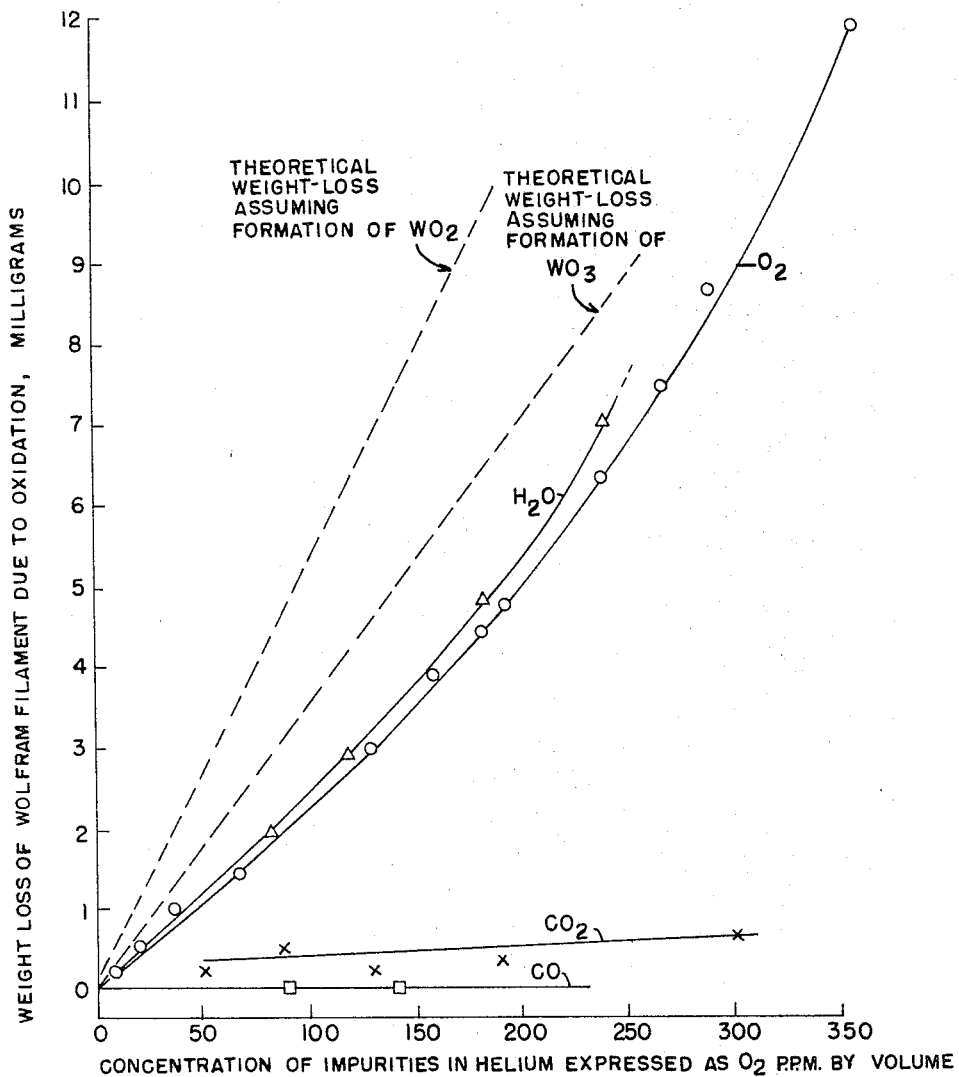
Figure 3:
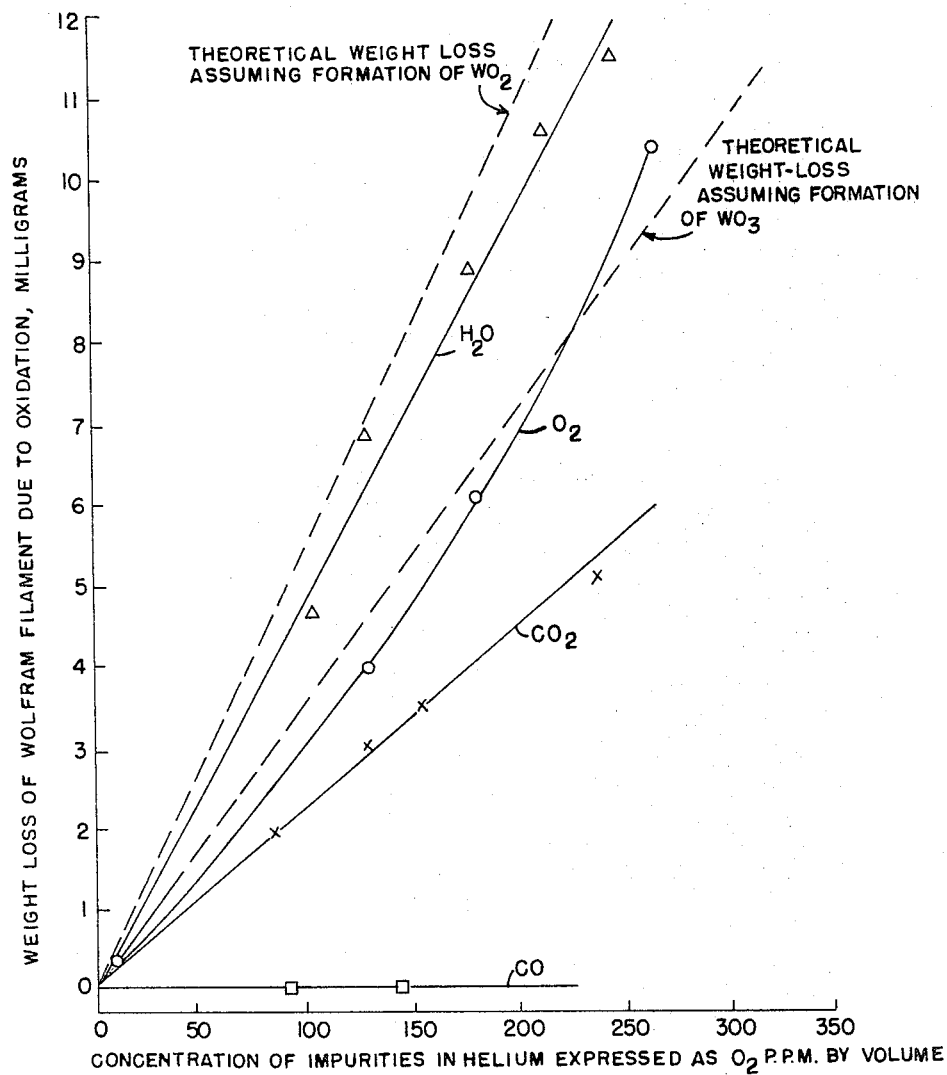

Further tests were made with helium containing known amounts of $O_2$, $H_2O$, $CO_2$ and CO. The procedure was the same as that described above and the data are given in FIGURES 2 and 3. FIGURE 2 shows that $CO_2$ reacts only slightly at a filament temperature of 2750° F., but $H_2O$ and $O_2$ react readily. FIGURE 3, however, shows that at a filament temperature of 3650° F. $CO_2$ reacts readily. CO caused no noticeable effect at either temperature.

The above examples illustrate determination of the amount of impurities of measurement of the loss in weight of the filament resulting from formation of volatile oxides. However, the amount of impurities may also be determined by measurement of the gain in weight of the filament when the impurities form non-volatile compounds with the filament. For example, a hydrocarbon such as methane when passed over a tungsten filament for one minute at a rate of 1.0 std. c.f.h., with the filament heated to 2850° F. resulted in a gain in weight of the filament of 8.82 mg. The gain in weight results from the formation of tungsten carbide.

CO impurity also results in gain in weight of the filament, e.g., CO passed over a tungsten filament heated to above 4500° F. for 15 minutes at a rate of 0.9 std. c.f.h. resulted in a gain in filament weight of 1.2 mg.

*Example 2*

This example compares the effectiveness of the method of the invention with that of the mass spectrograph in determining trace impurities in helium. Helium from three cylinders was analyzed by mass spectrograph. The same cylinders were also analyzed by the hot filament tester of the invention as shown in FIGURE 1. Filament weight losses were translated to oxidizing impurity content, expressed as p.p.m. $O_2$, by reference to the graph of FIGURE 2. The operating conditions used are also given in FIGURE 2. Results are given in Table II.

TABLE II.—OXIDIZING IMPURITY CONCENTRATION, P.P.M. BY VOLUME, EXPRESSED AS $O_2$

| Cylinder No. | Mass spectrograph | Hot filament tester |
|---|---|---|
| 1 [1] | [2] 4.2 | 4-14 |
| 2 | 11.6 | 10-13 |
| 3 | 246.3 | 258 |
| 4 | 52.4 | 38 |

[1] Cylinder was initially analyzed at full charge-pressure; it was analyzed again when returned at reduced pressure (about 400 p.s.i.g.)
[2] Initially 14.5 (after returned).

The determination of oxidizing impurities according to the method of the invention cannot be made in the presence of hydrogen since an excess of hydrogen over the oxidizing gases retards or completely stops oxidation of the incandescent filament. The presence of hydrocarbons has a similar deleterious effect in determination of oxidizing impurities. Therefore the method is not effective for determination of mixtures of hydrocarbons and oxidizing impurities although, as described above, either may be determined separately.

Separate determination of any of the individual oxidizing impurities $O_2$, $H_2O$ or $CO_2$ may be made in the presence of the other oxidizing impurities by maintaining the filament at a suitable temperature. At 3650° F. $O_2$, $H_2O$ (vapor) and $CO_2$ all react readily with the filament. At 2750° F. $CO_2$ does not react; combined $O_2$ and $H_2O$ may, therefore, be determined at this temperature.

Other means may also be utilized to remove one or more impurity constituents prior to determination by the method of the invention. For example, a cold trap may be used to freeze out the water before it enters the test chamber. $O_2$ and $CO_2$ may then be determined exclusive of $H_2O$. Chemical procedures may also be utilized to extend the usefulness of the process of the invention, e.g., oxidation inhibiting impurities such as $H_2$ and $CH_4$ may be converted to $H_2O$ and $CO_2$ by passing the gas over hot $CuO_2$ before the gas is passed over the filament.

Although helium has been used in the examples, oxidizing or hydrocarbon impurities in any inert gas, such as neon, argon, nitrogen, etc., may be determined by the process of the invention.

What is claimed is:
1. A method for quantitatively determining the amount of impurities in an inert gas which comprises (1) weighing a metallic filament, (2) electrically heating the filament to a controlled temperature, (3) passing the inert gas in contact with the heated filament, (4) cooling the filament and (5) reweighing the filament to determine the change in weight of the filament.
2. Method of claim 1 in which the inert gas is helium.
3. Method of claim 1 in which the impurities are from the group consisting of oxidizing impurities and hydrocarbons.
4. Method of claim 3 in which the impurities are oxidizing impurities.
5. Method of claim 4 in which the oxidizing impurities are from the group consisting of $O_2$, $H_2O$ and $CO_2$.
6. Method of claim 3 in which the impurity is a hydrocarbon.
7. Method of claim 6 in which the hydrocarbon is methane.
8. Method of claim 1 in which the filament is tungsten wire.
9. Method of claim 4 in which the filament is heated to a temperature sufficient to volatilize the oxides formed by reaction of the filament and oxidizing impurities and the amount of impurity is determined from weight-loss of the filament.
10. Method of claim 9 in which the filament temperature is about 2750° F.
11. Method of claim 4 in which the filament is heated to a temperature that is insufficient to volatilize the oxides formed by reaction of the filament and oxidizing impurities and the amount of impurity is determined from weight-gain of the filament.

12. Method of claim 11 in which the filament temperature is about 1200 to 1400° F.

13. Method of claim 9 in which the filament temperature is about 2750° F.

14. Method of claim 10 in which the filament temperature is about 3650° F.

References Cited

UNITED STATES PATENTS

| 1,240,700 | 9/1917 | Friederich | 313—233 X |
| 3,147,083 | 9/1964 | Stevending et al. | 23—232 |
| 3,262,756 | 7/1966 | Keilholtz et al. | 23—232 |

MORRIS O. WOLK, *Primary Examiner.*

R. SERWIN, *Assistant Examiner.*